United States Patent
Beyers et al.

(10) Patent No.: US 6,432,485 B1
(45) Date of Patent: Aug. 13, 2002

(54) EPOXIDE/AMINE BASED AQUEOUS COATING AGENTS AND USE THEREOF IN MULTICOAT LACQUERS

(75) Inventors: Heike Beyers, Wuppertal; Karin Maag, Inzlingen; Bettina Vogt-Birnbrich, Solingen, all of (DE)

(73) Assignee: E. I. duPont de Nemours & company, Wilmington, DE (US)

( * ) Notice: Subject to any disclaimer, the term of this patent is extended or adjusted under 35 U.S.C. 154(b) by 0 days.

(21) Appl. No.: 09/555,175

(22) PCT Filed: Sep. 3, 1999

(86) PCT No.: PCT/EP99/06484

§ 371 (c)(1),
(2), (4) Date: Jul. 14, 2000

(87) PCT Pub. No.: WO00/17251

PCT Pub. Date: Mar. 30, 2000

(30) Foreign Application Priority Data

Sep. 24, 1998 (DE) .......................................... 198 43 835

(51) Int. Cl.$^7$ ............................ B05D 1/36; C08L 63/00
(52) U.S. Cl. ..................... 427/407.1; 427/409; 427/410; 523/404; 523/415
(58) Field of Search ................................ 427/410, 409, 427/407.1; 523/404, 111, 123, 124, 415

(56) References Cited

U.S. PATENT DOCUMENTS

| | | | | |
|---|---|---|---|---|
| 4,260,697 A | * | 4/1981 | Kempter et al. | 525/484 |
| 4,399,242 A | | 8/1983 | Fowler et al. | 523/404 |
| 4,886,845 A | | 12/1989 | Becker et al. | 523/403 |
| 5,032,629 A | | 7/1991 | Hansen et al. | 523/414 |
| 5,084,544 A | * | 1/1992 | Muller et al. | 528/73 |
| 5,098,505 A | * | 3/1992 | Goel et al. | 156/307 |
| 5,153,296 A | * | 10/1992 | Gras et al. | 528/60 |
| 5,418,264 A | * | 5/1995 | Obloh et al. | 523/401 |
| 5,677,006 A | * | 10/1997 | Hoenel et al. | 427/372.2 |
| 5,906,864 A | * | 5/1999 | Osterhold et al. | 427/410 |
| 6,008,314 A | | 12/1999 | Collong et al. | 528/123 |

FOREIGN PATENT DOCUMENTS

| | | | |
|---|---|---|---|
| DE | 4344510 A1 | * | 6/1995 |
| EP | 0 523 610 B1 | | 1/1993 |
| EP | 0661355 A1 | * | 7/1995 |
| EP | 0 661 363 B1 | | 7/1995 |
| EP | 0735070 A1 | * | 10/1996 |
| WO | WO-96/06876 A1 | * | 3/1996 |
| WO | WO-97/49749 A1 | * | 12/1997 |

* cited by examiner

Primary Examiner—Shrive P. Beck
Assistant Examiner—Kirsten A. Crockford

(57) ABSTRACT

An aqueous surface coating agent containing

A) an amine component consisting of aminourethanes Al), which are obtainable by reacting compounds with at least one cyclic carbonate group with amines with at least one primary amine group, wherein the ratio of the number of cyclic carbonate groups to the number of primary amine groups is 1:10 to 1:1.1, and which may be reacted with hydrophilic water-dilutable epoxide compounds A2), wherein the ratio of the number of all the amine hydrogen atoms in Al) to the epoxide groups in A2) is 2:1 to 20:1, and B) an epoxide component consisting of urethane group-containing epoxide compounds which are obtainable by reacting one or more epoxide compounds c) with polyisocyanates d), wherein the polyisocyanates are used in an amount of 0.1 to 50 wt. %, with respect to the amount of epoxide compound.

7 Claims, No Drawings

EPOXIDE/AMINE BASED AQUEOUS COATING AGENTS AND USE THEREOF IN MULTICOAT LACQUERS

The invention provides two-component coating agents based on aqueous epoxide/amine systems with modified epoxide components. The invention also provides use of the coating agents as fillers and/or primers for multilayered lacquering, in particular in the vehicle and vehicle parts lacquering sector.

Due to ever more stringent conditions being placed on the protection of the environment, aqueous systems for the surface coating of items are becoming more and more important. Their properties also have to match those of conventional, i.e. solvent-containing, systems. Water dilutable epoxide resin systems have gained significance among surface coating agents which can be hardened at room temperature. These two-component (2C) systems are characterised by a number of good properties such as a very low proportion of, or no, solvent, good drying properties and rapid curing, good inter-layer adhesion and good anticorrosive properties on metals.

Various aqueous epoxide/amine systems based on different binders have already been described. For example, non-ionic stabilised aqueous epoxide resin dispersions are described in DE-A-36 43 751. These are based on the condensation products of epoxide compounds, aromatic polyols and condensation products of epoxide compounds and aliphatic polyols. EP-A-0 387 418, DE-A-43 44 510 and DE-A-196 25 345 describe various amine hardeners for aqueous epoxide systems based on specific epoxide/amine adducts and based on aminourethanes which have been reacted with a variety of non-ionic emulsifiers. DE-A-41 23 860 mentions conventional aqueous epoxide/amine systems which also contain a non-ionic polyurethane resin.

Furthermore, U.S. Pat. No. 4,399,242 describes aqueous epoxide resin dispersions consisting of 50 to 70 wt. % of a self-emulsifying epoxide resin, 1 to 25 wt. % of an aliphatic monoepoxide which is not miscible with water, as a reactive diluent, and 5 to 20 wt. % of a glycol or glycol ether. The self-emulsifying epoxide resin is a reaction product of 40 to 90 wt. % of a diglycidyl ether of a dihydric phenol, 5 to 35 wt. % of a dihydric phenol and 2 to 15 wt. % of a diglycidyl ether of a polyoxyalkylene glycol with 2 to 6 wt. % of a diisocyanate. It may be cross-linked with a polyamine.

The disadvantage of known aqueous epoxide/amine systems is that the coating agents prepared therefrom have insufficient sandability, in particular insufficient dry sandability. On the one hand the coatings obtained are so hard that an adequately large amount of material can be sanded off only with the expenditure of a great deal of time, or else sometimes no sanding at all is possible and the surface is simply scratched. On the other hand, there are aqueous epoxide amine systems which rapidly soften during sanding, due to their pronounced thermoplasticity and this causes blocking to the sandpaper within a short time.

Furthermore, the disadvantage of most known aqueous epoxide/amine systems is that they cannot be applied in a bubble-free manner, especially in very thick layers of, for example, 140 µm and even after drying at elevated temperatures of, for example, 40 to 60° C., bubble-formation may take place in the surface coating. In particular in the case of the amine hardeners for aqueous epoxide resins described in DE-A-43 44 510 and DE-A-196 25 345, variations in the binder quality can occur, due to the method of production, which has a negative effect on the characteristics of the final lacquer or the resulting surface coating.

The object of the invention was, therefore, to provide aqueous two-component surface coating agents which have adequate processing times, can be applied bubble-free, even in thicker layers and produce coatings with defect-free surfaces. The coatings should be readily sandable in the wet and in particular in the dry state and should have no detachment or creep characteristics, especially when subjected to the humidity/heat test. Variations in the binder quality of the amine hardener resulting from the method of production should not have a negative effect on the characteristics of the lacquer or the surface coatings resulting therefrom. The surface coating agents should have a sufficiently long pot-life. The surface coating agents should be suitable for producing, for example, filler layers during a multi-layer lacquering process.

The object is achieved by two-component aqueous surface coating agents containing A) as an amine component, one or more aminourethanes A1), which are obtainable by reacting
   a) compounds with at least one cyclic carbonate group, in particular a 2-oxo-1,3-dioxalan group and/or a 2-oxo-1,3-dioxan group, with
   b) one or more amines with at least one primary amine group, wherein the ratio of the number of cyclic carbonate groups to the number of primary amine groups is 1:10 to 1:1.1,
   and which may optionally be reacted with
   one or more hydrophilic water-dilutable epoxide compounds A2), wherein the ratio of the number of all the amine hydrogen atoms in A1) to the epoxide groups in A2) is preferably 2:1 to 20:1, and B) as an epoxide component, one or more urethane group-containing epoxide compounds which are obtainable by reacting one or more epoxide compounds c) with one or more polyisocyanates d), wherein the polyisocyanates are used in an amount of 0.1 to 50 wt. %, preferably 0.5 to 25 wt. %, in particular 2 to 15 wt. %, with respect to the amount of epoxide compound (solids to solids).

A preferred variant of the invention consists of reacting the aminourethanes A1) with hydrophilic non-ionic epoxide compounds A2) in order thus to ensure improved water-dilutability and stable dispersion of the amine hardener.

Surprisingly, it was found that when using surface coating agents according to the invention, quality variations in the amine components, due to the method of production, can easily be compensated for so that negative effects on the characteristics can no longer be detected in the final lacquer or the resulting surface coatings.

The amine component A) and the epoxide component B) will be described more precisely in the following.

The amine component A) is an aminourethane A1), these being obtained by reacting compounds with at least one cyclic carbonate group (a) with one or more amines with at least one primary amine group (b).

The compounds which contain cyclic carbonate groups which can be used as component a) to prepare aminourethanes A1) are in particular those which contain one, preferably two or more, 2-oxo-1,3-dioxalan or 2-oxo-1,3-dioxan groups, wherein these are preferably in the terminal position. Component b) consists of amines which contain at least one primary, preferably several primary, and optionally also secondary and tertiary amine groups.

To prepare aminourethanes A1), conventional cyclic carbonates which can be prepared, for example, by reacting carbon dioxide with epoxide compounds in a known manner, are used as component a). These epoxide compounds are preferably polyglycidyl ethers based on polyhydric, preferably dihydric alcohols, phenols, hydrogenation products of these phenols and/or on Novolaks (reaction products of monohydric or polyhydric phenols with aldehydes, in particular formaldehyde, in the presence of acid catalysts). The epoxide equivalent weights of these epoxide compounds are preferably between 100 and 2000, in particular between 100 and 350. The epoxide compounds may be used individually or as a mixture.

Furthermore, conventional cyclic carbonates may be used as component a), such as, for example, those obtained by reacting carbonates such as e.g. dimethyl carbonate, diethyl carbonate, diphenyl carbonate, ethylene carbonate or propylene carbonate with polyols, wherein the polyols contain at least four hydroxyl groups, two each of which react with carbonates in a transesterification reaction to give cyclic five-membered or six-membered ring carbonates. Polyhydric polyols which may be mentioned are, for example: diglycerine, triglycerine, polyglycerine, sugar alcohols (e.g. xylitol, mannitol, erythritol), dimethylol- and trimethylolpropane, dimethylol- and trimethylolethane, pentaerythritol and dipentaerythritol. Of these, diglycerine is particularly preferred.

Cyclic carbonates are prepared from polyols in a manner which is familiar to a person skilled in the art, in particular by reacting the polyols with the carbonates in the stoichiometric ratio of 1.0:1.0 to 1.0:10.0 (ratio of 1,2- or 1,3-glycol groups to carbonate groups), in particular in the presence of a catalyst. Suitable catalysts are, for example, basic catalysts such as e.g.: carbonates, bicarbonates, alcoholates, carboxylates, hydroxides or oxides of the alkali and alkaline earth metals, and also Lewis acid substances such as e.g. organic compounds of divalent or tetravalent tin or titanium, e.g. tin(II) octoate, tin(II) laurate, dibutyltin oxide or titanium tetrabutylate. The catalysts may be added, for example, in an amount of 0.01 to 1.0 wt. %, with respect to the polyol and carbonate.

When preparing aminourethanes A1), amines, preferably polyamines, which contain primary amine groups capable of reacting with the carbonate groups in a) are used as the amine component b). These may be, for example, polyamines, amine/epoxide adducts and/or modified derivatives thereof.

Examples of polyamines which may be mentioned are polyalkylenamines such as diethylenetriamine, triethylenetetramine, tetraethylenepentamine, pentaethylenehexamine, propylenediamine, dipropylenetriamine, also 2,2,4- and/or 2,4,4-trimethylhexamethylenediamine, bis-(3-aminopropyl)-amine, 1,4-bis-(3'-aminopropyl)-piperazine, N,N-bis-(3-aminopropyl)-ethylenediamine, neopentanediamine, 2-methyl-1,5-pentanediamine, 1,3-diaminopentane, hexamethylenediamine, and also cycloaliphatic amines such as 1,2- or 1,3-diaminocyclohexane, 1,4-diamino-3,6-diethylcyclohexane, 1,2-diamino-4-ethylcyclohexane, 1,4-diamino-3,6-diethyl-cyclohexane, 1-cyclohexyl-3,4-diaminocyclohexane, isophoronediamine and reaction products thereof, 4,4'-diaminodicyclohexylmethane, and -propane, 2,2-bis-(4-aminocyclohexyl)-methane and -propane, 3,3'-dimethyl-4,4'-diaminodicyclohexyl-methane, 3-amino-1-cyclohexylaminopropane, 1,3- and 1,4-bis-(amininomethyl)-cyclohexane.

Araliphatic amines, in particular those in which aliphatic amine groups are present are also suitable, e.g. meta and para-xylylenediamine.

Suitable amine/epoxide adducts are, for example, reaction products of polyamines such as e.g. ethylenediamine, propylenediamine, hexamethylenediamine, 2,2,4- and 2,4,4-trimethylhexamethylenediamine, meta-xylylenediamine and/or bis-(aminomethyl)-cyclohexane with terminal monoepoxides or polyepoxides such as e.g. propylene oxide, hexene oxide, cyclohexene oxide, or with glycidyl ethers such as phenylglycidyl ether, tert.-butylglycidyl ether, ethylhexylglycidyl ether, butylglycidyl ether or with glycidyl esters such as, for example, the glycidyl ester of versatic acid or with polyglycidyl ethers and esters.

The amines may be used individually or as a mixture. They should be chosen in such a way that they contain at least one, but preferably more, than one, free primary amine group.

Components a) and b) are generally reacted in the required stoichiometric ratio using conventional methods, for example at elevated temperature, optionally using an inert solvent. Reaction in the presence of solvents which are inert towards cyclocarbonate groups represents a preferred process variant. The amine number (titration with perchloric acid) and the cyclocarbonate equivalent number (titration with potassium hydroxide solution) are used to assess the stoichiometric relationship of the starting products and also of the end products and for reaction control purposes. When reacting components (a) and (b), the amine compounds may be added to the reaction individually or as a mixture, at the same time or in sequence, optionally dissolved in an inert solvent.

The reaction is performed under reaction and process conditions under which the cyclocarbonate groups in component a) can react only with the primary amine groups in component b), which can be achieved by methods familiar to a person skilled in the art, without corresponding reactions also taking place with any secondary amine groups which may be present and which are chemically much more inert.

Suitable inert solvents are e.g. aromatic hydrocarbons such as xylene and toluene, alcohols such as methanol, ethanol, butanols, pentanols, 1,2-propanediol, ethylene glycol and glycol ethers such as methoxyethanol, ethoxyethanol, methoxypropanol, butoxyethanol, methoxybutanol, glycol dimethyl ether and diglycol dimethyl ether etc. The ratios by weight of (a): (b) are chosen so that aminofunctional reaction products (A1) are formed. At least one primary, preferably several primary, amine groups should preferably be present per molecule in the reaction product. Products with from oligomeric up to polymeric characteristics can be obtained by varying the ratios by weight, wherein oligomers are particularly preferred. Thus, the ratios by weight of cyclic carbonate a) to polyamine b) are preferably chosen so that the ratio of the number of cyclic carbonate groups to the number of primary amine groups is 1.0:5.0 to 1.0:1.5.

Aminourethanes A1) are preferably reacted with hydrophilic, preferably non-ionic, epoxide compounds A2) via their amine groups, wherein the ratio of the number of all the amine hydrogen atoms to the number of epoxide groups is preferably 2:1 to 20:1, in particular 2:1 to 5:1.

Hydrophilic epoxide compounds A2) which are suitable for reacting with aminourethanes A1) are e.g. condensation products of conventional polyepoxides and polyetherpolyols with a weight average molecular weight (Mw) of, for example, 600 to 12000, preferably 2000 to 8000. For example, the hydrophilic epoxide compounds which may be used are like those described in detail in e.g. EP-A-000 605 and in DE-A-43 09 639. Reaction products of the previously described aminourethanes A1) with hydrophilic epoxide compounds A2) are described in detail in DE-A-43 44 487 for example and these may also be used.

Hydrophilic epoxide compounds A2) which are suitable for use to react with aminourethanes A1) are preferably the reaction products of e) one or more polyalkylenepolyethers with at least one primary and/or secondary amine group in the alpha position and at least one alkyl ether or aryl ether group in the omega position and/or one or more polyalkylenepolyethers with two primary and/or secondary alpha, omega amine groups, each with a weight average molecular weight (Mw) of 200 to 20000 and f) one or more epoxide compounds with at least two epoxide groups per molecule and an epoxide equivalent weight of 100 to 2000.

The ratio of the number of primary and/or secondary amine groups in component e) to epoxide groups in component f) is then 1:2 to 1:20, preferably 1:4 to 1:8 and the epoxide equivalent weight of the condensation products obtained from e) and f) is, for example, between 150 and 8000, preferably 250 to 1000.

Components e) which are suitable for preparing hydrophilic epoxide compounds A2) are polyalkylenepolyethers with terminal secondary or primary amine groups and terminal alkyl or aryl ether groups and/or polyalkylenepolyethers with terminal secondary or primary amine groups. The polyalkylenepolyetheramines preferably have a weight average molecular weight (Mw) of 200 to 20000. The fundamental units in the polyalkylenepolyether units may be, for example, ethyl, propyl and butyl units. They may be, for example, the reaction products of ethylene oxide, propylene oxide, butylene oxide or amylene oxide with monohydric and/or polyhydric alcohols or a polyether based on tetrahydrofuran. Polyalkylenepolyetheramines based on ethylene oxide or propylene oxide are preferred. Polyalkylenepolyethermonoamines are particularly preferred.

For example, products like those which are sold under the tradename Jeffamine® by the Huntsman Corporation Belgium N.V. may be used as component e).

Polyepoxide compounds f) which are suitable for preparing hydrophilic epoxide compounds A2) are, for example, those which were described above for preparing cyclic carbonates a). The following may be mentioned by way of example from the large number of polyfunctional epoxide compounds which can be used: the epoxides of polyunsaturated hydrocarbons (e.g. vinylcyclohexane, dicyclopentadiene, cyclohexadiene, butadiene), epoxide ethers of polyhydric alcohols (e.g. ethylene, propylene or butylene glycols, glycerine, pentaerythritol, sorbitol, polyvinyl alcohol), epoxide ethers of polyhydric phenols (e.g. resorcinol, hydroquinone, bis-(4-hydroxyphenyl)-methane, bis-(4-hydroxy-3-methylphenyl)-methane, bis-(4-hydroxy-3,5-dibromophenyl)-methane, 1-bis-(4-hydroxyphenyl)-ethane, 2,2-bis-(4-hydroxy-3-methylphenyl)-methane, 2,2-bis-(4-hydroxy-3-chlorophenyl)-propane, 2,2-bis-(4-hydroxy-3,5-dichlorophenyl)-propane, 1,1-bis-(4-hydroxyphenyl)-cyclohexane, bis-(4-hydroxyphenyl)-cyclohexylmethane and epoxides which have been prepared by conventional methods from polyunsaturated carboxylic acids or monounsaturated carboxylic esters of unsaturated alcohols.

Preferably used epoxide compounds are polyphenol glycidyl ethers, e.g. the reaction products of epichlorohydrin and bisphenol A or bisphenol F. These types of epoxide resins have an epoxide equivalent of, for example, 160 to 500. Mixtures of corresponding epoxide compounds may also be used.

Aminourethanes A1) are thus reacted, in a preferred embodiment, with hydrophilic epoxide compounds A2). The aminourethanes may then, admixed with further amine compounds, preferably polyamines which contain at least one primary and optionally also secondary or tertiary amine groups, be reacted with the hydrophilic epoxide compounds. Suitable further amine compounds are, for example, all the amines which were mentioned previously for use as component b).

Preparation of the adducts from aminourethanes A1), optionally further amine compounds and hydrophilic epoxide compounds A2) is not subject to any specific rules. Preferred preparative variants are described in detail in DE-A- 196 25 345, to which express reference is made at this point.

Aminourethanes A1) and the previously described and preferred epoxide/aminourethane adducts (reaction products of A1) and A2)) may be used as the only hardener or mixed with other amine hardeners.

Examples of other amine hardeners are all the amines mentioned under b), preferably polyamines, epoxide/amine adducts, Mannich bases and polyamidoamines, which may be used individually or as a mixture. Suitable Mannich bases are prepared by the condensation of polyamines, preferably diethylenetriamine, triethylenetetramine, isophoronediamine, 2,2,4- or 2,4,4-trimethylhexamethylenediamine, 1,3- and 1,4-bis-(aminomethyl)-cyclohexane, in particular meta and para-xylylenediamine with aldehydes, preferably formaldehyde, and monohydric or polyhydric phenols with at least one ring position which is reactive towards aldehydes, for example the various cresols and xylenols, para-tert-butylphenol, resorcinol, 4,4'-dihydroxydiphenylmethane, 2,2-bis-(4'-hydroxyphenyl)-propane, but preferably phenol. Araliphatic amines which are particularly suitable for use are those in which aliphatic amine groups are present, e.g. meta and para-xylylenediamine. Polyamidoamines, which may also be used as a hardener, are obtained, for example, by reacting polyamines with mono or polycarboxylic acids, e.g. dimerised fatty acids.

Apart from the systems mentioned above, water-soluble polyalkylenepolyetherdiamines and polyalkylenepolyetherpolyamines may be used as amine hardeners. The polyalkylenepolyetherdiamines and polyalkylenepolyetherpolyamines preferably have a weight average molecular weight (Mw) of 200 to 20000 g/mol. The basic unit in the polyalkylenepolyether units may be, for example ethyl, propyl and butyl units. They may be, for example, reaction products of ethylene oxide, propylene oxide, butylene oxide, or amylene oxide with monohydric or polyhydric alcohols or polyethers based on tetrahydrofuran.

Epoxide component B) consists of one or more urethane group-containing epoxide compounds which are the reaction products of epoxide compounds c) and polyisocyanates d). The ratio by equivalents of hydroxyl groups in epoxide compounds c) to isocyanate groups in component d) is then at most 1:1, preferably 1:0.01 to 1:1, in particular 1:0.05 to 1:1.

Epoxide resins which are known for use in aqueous systems are suitable as epoxide compounds c) for preparing epoxide component B). The epoxide resins may be, for example, those epoxide compounds which have already been described for component f). Especially suitable are, for example, modified non-ionic stabilised epoxide resins such as are described in DE-A-36 43 751. Furthermore, the use of any epoxide resin at all is possible, like those which are familiar to a person skilled in the art for aqueous two-component epoxide/amine systems. These may be commercially available di or polyepoxides. These are film-forming epoxide resins which are provided as aqueous dispersions or as water-dilutable resins. Examples of such polyepoxides are polyglycidyl ethers based on aliphatic or aromatic diols such as bisphenol A, bisphenol F or polyalkylene glycol.

To prepare epoxide component B), epoxide compounds c) are reacted with polyisocyanates d). Reaction takes place with complete consumption of the isocyanate groups, i.e. the polyisocyanate component is used in a deficiency with respect to the hydroxyl groups in the epoxide compounds c) or at most in an amount such that all the hydroxyl groups in component c) are reacted. Compounds which are suitable as polyisocyanate component d) are any organic polyisocyanates with aliphatically, cycloaliphatically, araliphatically and/or aromatically bonded free isocyanate groups.

The polyisocyanates are preferably polyisocyanates or polyisocyanate mixtures with exclusively aliphatically and/or cycloaliphatically bonded isocyanate groups with an average isocyanate functionality of 1.5 to 5, preferably 2 to 3.

Examples of suitable diisocyanates are trimethylene diisocyanate, tetramethylene diisocyanate, pentamethylene diisocyanate, propylene diisocyanate, ethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, bis-(4-isocyanatophenyl)-methane, norbornene diisocyanate, 4,4-diisocyanato-diphenyl ether, 2,3-bis-(8-isocyanatooctyl)4-octyl-5-hexylcylclohexane, 3-isocyanatomethyl-1-methylcyclohexyl isocyanate and/or 2,6-diisocyanatomethyl capronate.

Especially suitable polyisocyanates are also so-called "lacquer polyisocyanates" based on hexamethylene diisocyanate, 1-isocyanato-3,3,5-trimethyl-5-isocyanatomethylcyclohexane (IPDI) and/or bis-(isocyanatocyclohexyl)-methane and the biuret, allophanate, urethane and/or isocyanurate group-containing derivatives of these diisocyanates known per se. Triisocyanates such as e.g. nonane triisocyanate may also be used. Sterically hindered polyisocyanates are also suitable. Examples of these are 1,1,6,6-tetramethylhexamethylene diisocyanate, 1,5-dibutylpentamethylene diisocyanate, p- or m-tetramethylxylylene diisocyanate and the corresponding hydrogenated homologues. These diisocyanates may also be reacted in a suitable manner to give higher functional compounds, for example by trimerisation or by reacting with water or trimethylolpropane.

The polyisocyanates may be used individually or as a mixture.

Surface coating agents according to the invention may contain pigments and/or fillers. The pigments may be colour and/or effect providing pigments. Suitable colour providing pigments are all the conventional lacquer pigments of an organic or inorganic nature.

Examples of inorganic or organic colouring pigments are titanium dioxide, micronised titanium dioxide, iron oxide pigments, carbon black, azo pigments, phthalocyanin pigments, quinacridone or pyrrolopyrrol pigments. Examples of effect providing pigments, which are not typical of filler formulations however, are metal pigments, e.g. consisting of aluminium, copper or other metals; interference pigments such as e.g. metal oxide coated metal pigments, e.g. titanium dioxide coated or mixed oxide coated aluminium, coated mica such as e.g. titanium dioxide coated mica and graphite effect pigments. Anticorrosion pigments, such as e.g. zinc phosphate, may also be present.

Fillers may also be contained in the surface coating agents. These are fillers which are conventionally used in the lacquer industry. Examples of fillers are silicon dioxide, aluminium silicate, barium sulfate, calcium carbonate and talcum.

Furthermore, surface coating agents according to the invention may also contain water and a small amount of organic solvents.

The organic solvents optionally present in the surface coating agents are conventional lacquer solvents. These may arise from preparation of the binder or be added separately. They are preferably water-miscible solvents. Examples of suitable solvents are monohydric or polyhydric alcohols, e.g. propanol, butanol, hexanol; glycol ethers or esters, e.g. diethyleneglycol dialkyl ether, dipropyleneglycol dialkyl ether, each with $C_1$–$C_6$ alkyl groups, ethoxypropanol, butyl glycol; glycols, e.g. ethylene glycol, propylene glycol and their oligomers, N-methylpyrrolidone and also ketones, e.g. methylethyl ketone, acetone, cyclohexanone; aromatic or aliphatic hydrocarbons e.g. toluene, xylene or linear or branched aliphatic $C_6$–$C_{12}$ hydrocarbons. The proportion of organic solvent is at most, for example, up to 10 to 15 wt. %, with respect to the entire surface coating agent.

Furthermore, surface coating agents according to the invention may also contain conventional lacquer additives. Examples of conventional lacquer additives are flow control agents, agents which have an effect on rheology such as highly disperse silica or polymeric urea compounds, thickeners such as cross-linked polycarboxylic acids or polyurethanes, defoamers, wetting agents, anti-crater agents, bonding agents and hardening accelerators. The additives are used in conventional amounts, known to a person skilled in the art.

Surface coating agents according to the invention may be prepared in a conventional manner. Thus, the pigments and/or fillers may be dispersed in either the epoxide resin component or in the amine component. They are preferably dispersed in the amine component. However, it is also possible to perform dispersion with an additional network resin. Since the system is a two-component system, binder components A) and B) which react with each other are stored separately from each other and may be mixed together shortly before application. The ratio by equivalents of amine groups to epoxide groups may be, for example, 5:1 to 1:5, preferably 1.5:1 to 1:1.5.

If required, the mixture may generally be set to spray-viscosity with water or organic solvents prior to application.

Coating agents according to the invention are especially suitable for preparing filler and/or primer layers in air drying or forced drying multilayered coatings. However, they may also be hardened at elevated temperatures of e.g. 80 to 140° C. Temperatures below 80° C. are preferred, however. They are suitable for lacquering vehicles and industrial goods, in particular for repair-lacquering of vehicles and parts of vehicles.

The invention thus also provides use of the surface coating agents for preparing multilayered coatings, wherein in particular the filler and/or primer layers of multilayered coatings are formulated as surface coating agents according to the invention. The preferred area of application of surface coating agents according to the invention is vehicle and vehicle parts lacquering. The surface coating agents are, depending on the hardening conditions, used either for vehicle repair lacquering (hardening temperatures of, for example, 20 to 80° C.) or for vehicle lacquering (hardening temperatures of, for example, 100 to 140° C.). Other industrial applications are also possible, however.

The surface coating agents are applied using conventional methods, preferably using a spray application process.

Suitable substrates are metal and plastics substrates, in particular substrates known in the automobile industry such as e.g. iron, zinc, aluminium, magnesium, stainless steel or their alloys, as well as polyurethanes, polycarbonates or polyolefins. The filler layers may be applied to optionally pre-treated substrates as such or also to conventional primers. They adhere well to very different substrates such as e.g. bright steel sheets, sanded polyvinylbutyral primer, 2C epoxide primers, sanded down factory or old lacquer finishes. Surface coating agents according to the invention exhibit outstanding anticorrosive properties, in particular as primer-fillers and in particular on steel surfaces. After drying and optionally sanding down, a surface coating agent according to the invention can easily be overpainted with a conventional topcoat lacquer. This may be a monolayered topcoat lacquer, e.g. based on a 2C acrylate/polyisocyanate system, or built up from a conventional basecoat/clear coat. It may be overpainted with solvent-based or water-based surface coating agents. The surface coating agents according to the invention may be dried, for example, over a long period of time, e.g. 18 hours (overnight), at room temperature. However, they may also be subjected, optionally after an evaporation time of, for example, about 10 to 30 minutes, to a drying process at elevated temperatures, for example during 20 to 60 minutes at e.g. 40 to 60° C.

The coating agents according to the invention can be applied bubble-free, even in thicker layers of, for example, 100 to 140 μm. After cross-linking, homogeneously coated substrates with smooth defect-free surfaces are obtained. The coatings exhibit no pin-holes. Surface coating agents according to the invention have exceptional sandability when compared with known aqueous epoxide/polyamine systems. Even after a short drying time the coatings can easily be sanded when wet, and in particular also when dry. Adequate abrasion of material is achieved. Rapid blocking of the sandpaper is not observed.

After being subjected to a humidity/heat test, there is no loss of adhesion, i.e. no detachment from the substrate is observed.

After drying and sanding down, coating agents according to the invention can be easily overpainted with conventional topcoat lacquers. These may be monolayered topcoat lacquers, e.g. based on 2C acrylate/polyisocyanate systems or built up from a conventional basecoat/clear coat. They may be overpainted with solvent-based or water-dilutable coating agents.

The invention will be explained in more detail in the examples given below.

EXAMPLE 1
Preparing an Amine Hardener

An amine hardener consisting of aminourethanes and hydrophilic epoxide components in accordance with DE-A-196 25 345, table 6.3, hardener W1, is used.

EXAMPLE 2
Preparing an Epoxide Component 52.7 parts by wt. of a commercially available aqueous epoxide resin (Beckopox EP 384 w, 53% strength, OH value 300 mg KOH/g) are reacted with 2.7 parts by wt. of a commercially available polyisocyanate hardener based on hexamethylene diisocyanate (HDI) (50% strength in fully deionised (VE) water.

EXAMPLE 3
Preparing a Filler 9.3 parts by wt. of the amine hardener from example 1 are thoroughly mixed with 68.6 parts by wt. of VE water and 3.1 parts by wt. of a commercially available thickener. 3.6 parts by wt. of a commercially available defoamer (50% strength) and 0.5 parts by wt. of a commercially available corrosion inhibitor (inhibitor L1) are added to the mixture and also thoroughly homogenised.

The following pigments and fillers are dispersed in this mixture in a conventional manner:

1.2 parts by wt. of silicon dioxide
1.2 parts by wt. of iron oxide yellow
6.6 parts by wt. of quartz powder
23.6 parts by wt. of kaolin
28.3 parts by wt. of barium sulfate
26.0 parts by wt of titanium dioxide
5.4 parts by wt. of an anti-corrosive pigment Shortly before application, 55.4 parts by wt. of the epoxide component from example 2 are added to the polyamine component obtained in this way and the two components are intensively mixed by stirring. The filler has a pot life of about 2.5 hours.

EXAMPLE 4
Preparing a Comparison Filler

The same procedure is used as in example 3, but with the difference that 52.7 parts by wt. of a commercially available aqueous non-modified epoxide resin (Beckopox EP 384 w, 53% strength) is used as the epoxide component.

Applying the Filler

To assess the lacquer properties, the filler and the comparison filler were each sprayed onto steel substrates, pre-coated with a catophoretic primer, and dried for 60 minutes at 60° C. The lacquer property results are given in the table below.

| Property | Filler according to the invention | Comparison filler |
| --- | --- | --- |
| Sandability/dry (1) | 2 | 3–4 |
| Rapid blocking of the sandpaper | no | yes |
| Bubble production (2) after 1st spray | none | 5 |
| Bubble production after oven-drying (45 min, 60° C.) | none | 6 |
| Adhesion (3) | | |
| after 16 h at room temperature | 1–2 | 2 |
| after 16 h at 60° C. | 1 | 2 |
| Adhesion (3) after humidity/heat test (4) | | |
| after 1 h | 5 | 5 |
| after 24 h | 1–2 | 2–3 |
| after 7 days | 2 | 2–3 |
| Creep (5) after humidity/heat test (4) | 0.1 mm | 0.3 mm |
| Surface quality | no pinholes | a few small pinholes |

(1) Assessment: 1 - very good, 2 - good, 3 - acceptable, 4 - defective, 5 - no good
(2) Number of bubbles per surface
(3) Cross-hatching as described in DIN 53151
(4) Humidity/heat test according to DIN 50017
(5) Creep according to DIN 53167

What is claimed is:
1. An aqueous surface coating agent comprising:
A) an amine component consisting of at least one aminourethane A1), produced by the reaction of:
a) at least one compound having at least one cyclic carbonate group; with b) at least one amine having at least one primary amine group, wherein the ratio of the number of cyclic carbonate groups to the number of primary amine groups is 1:10 to 1:1.1, and which may optionally be reacted with at least one hydrophilic water-dilutable epoxide compound A2), wherein the ratio of the number of all the amine hydrogen atoms in A1) to the epoxide groups in A2) is 2:1 to 20:1; and B) an epoxide component consisting of at least one urethane group-containing epoxide compound produced by the reaction of at least one epoxide compound c) with at least one polyisocyanate d), wherein the at least one polyisocyanate is used in an amount of 0.1 wt. % to 50 wt. %, with respect to the amount of epoxide compound (solids to solids).

2. A surface coating agent according to claim 1, wherein the at least one hydrophilic epoxide compound A2) suitable for reacting with the at least one aminourethane A1) is the reaction product of a) at least one polyalkylenepolyether having at least one primary and/or secondary amine group in the alpha position and at least one alkyl ether or aryl ether group in the omega position and/or at least one polyalkylenepolyether having two primary and/or secondary alpha or omega amine groups, each having a weight average molecular weight (Mw) of 200 to 2000; and b) at least one epoxide compound having at least 2 epoxide groups per molecule and an epoxide equivalent weight of 100 to 2000.

3. A surface coating agent according to claim 2 wherein the at least one aminourethane A1) is reacted with at least one hydrophilic non-ionic epoxide compound A2).

4. A surface coating agent according to claim 3 wherein the at least one compound containing at least one cyclic carbonate group comprises at least one group of 2-oxo-1,3-dioxolan or 2-oxo-1,3-dioxan. dioxan.

5. A surface coating agent according to claim 1, wherein the surface coating agent contains at least one of the group consisting of pigments, fillers, organic solvent and conventional lacquer additives.

6. A surface coating agent according to claim 1, wherein the binder components A) and B) are mixed and wherein the ratio by equivalents of amine groups to epoxide groups is 5:1 to 1:5.

7. A process for preparing multilayered lacquer finishes comprising the steps of: applying a primer layer; applying a filler layer; and applying a topcoat layer or a basecoat/clear coat layer, wherein the surface coating agent according to claim 1, is used to formulate the primer and/or filler layers.

* * * * *